United States Patent [19]
Matthews, Jr.

[11] 3,788,084
[45] Jan. 29, 1974

[54] RECOVERY OF MARINE PIPELINES
[75] Inventor: Jamie F. Matthews, Jr., Houston, Tex.
[73] Assignee: Esso Production Research Company, Houston, Tex.
[22] Filed: June 23, 1972
[21] Appl. No.: 265,900

[52] U.S. Cl.............. 61/72.3, 15/104.06, 166/153, 294/93, 294/96
[51] Int. Cl............................ F16l 1/00, B08b 9/04
[58] Field of Search..... 61/72.3, 72.1; 15/104.06 A; 294/93, 96, 88; 166/.5, 153, 156; 138/93, 88

[56] References Cited
UNITED STATES PATENTS
2,759,757  8/1956  Pace ................................... 294/93
3,643,280  2/1972  Powers............................. 15/104.06
3,525,111  8/1970  Von Arx.......................... 15/104.06

Primary Examiner—Jacob Shapiro
Attorney, Agent, or Firm—James A. Reilly et al.

[57] ABSTRACT

A liquid-filled pipeline is recovered from the bottom of a body of water by introducing gas into a submerged end of the line behind a one-way pigging device until a section of the line at least sufficiently long to reach to the surface of the body of water has been substantially voided of liquids and thereafter lifting the end of the pipeline to the water's surface. The procedure disclosed often reduces substantially the amount of liquid that must be removed from the line to permit lifting of the pipe without danger of buckling.

21 Claims, 5 Drawing Figures

PATENTED JAN 29 1974 3,788,084
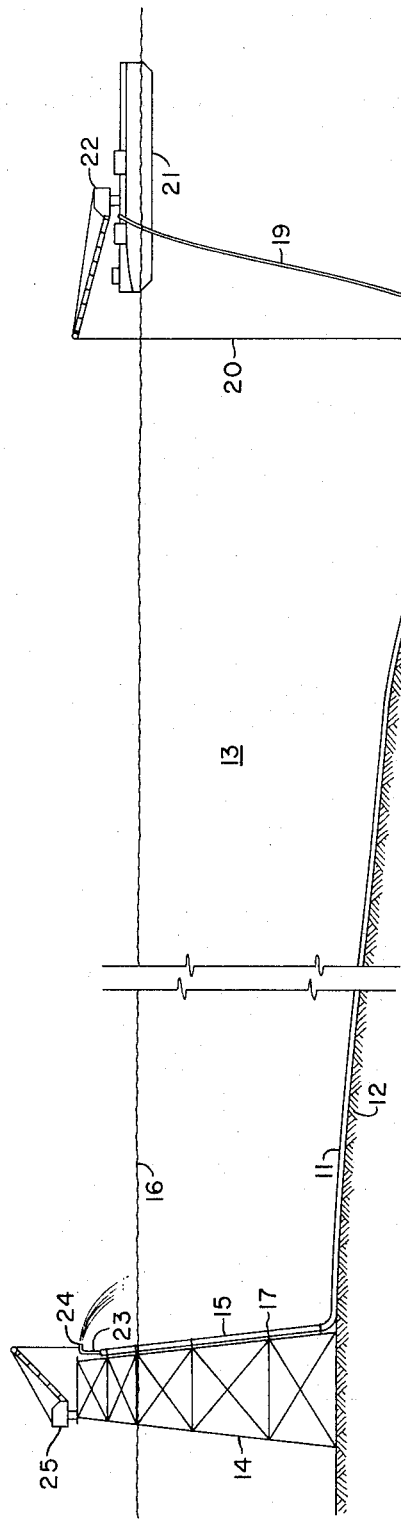
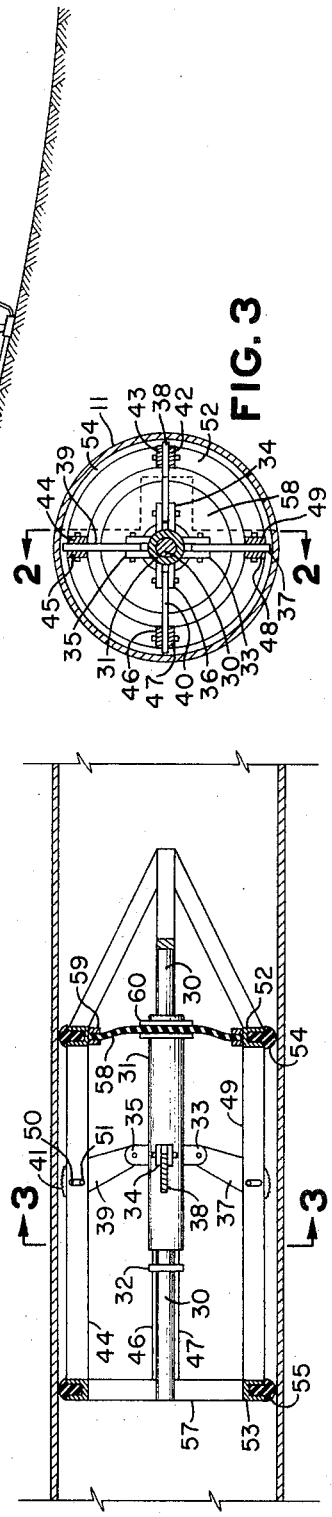
FIG. 1
FIG. 2
FIG. 3
FIG. 4
FIG. 5

RECOVERY OF MARINE PIPELINES

BACKGROUND OF THE INVENTION

1. Field of the Invention

This invention relates to the recovery of marine pipelines and is particularly concerned with a method and apparatus for recovering the end of a liquid-filled line from the bottom of a body of water.

2. Description of the Prior Art

Conventional methods for laying pipelines in deep water involve the use of a laybarge or similar vessel from which the pipe is lowered into place as the vessel moves along the pipeline route. The suspended pipe between the stern of the moving vessel and the bottom of the body of water bends under its own weight and assumes a generally S-shaped configuration. The amount of bending that occurs depends upon the weight and dimensions of the pipe, the depth of the water, the amount of tension maintained in the line, and other factors. Excessive bending results in buckling or kinking of the pipe and hence a pipe discharge ramp or stinger which extends into the water behind the vessel is normally used to support the pipe and limit its radius of curvature. Although such methods are generally effective, buckling and flooding of the line may occur if the vessel is caught in a sudden storm and the mooring system, tensioning equipment, or stinger fails. When this occurs, the end of the pipeline must be raised to the water's surface and repaired before pipelaying operations can be resumed.

The weight and strength of the pipe used in most marine operations are such that the line generally has to be voided of liquids before it can be lifted to the surface. Unless this is done, overstressing and additional buckling or kinking are apt to occur. The conventional method of removing the liquids is to have a diver cut off the damaged portion of the pipe with an underwater electric arc-oxygen cutting torch, burn holes through the pipe wall, and then install a bar or long bolt through the holes to block the end of the pipe. A pipeline pig is then inserted into the other end of the pipeline at an accessible point onshore or at an offshore platform to which the pipeline is connected. Compressed air is then injected into the pipeline at the shore station or platform to move the pig forward and displace water from the line. After the pig has reached the blocked end of the pipe and the line has thus been voided of liquids, cables are attached to the line and the end is raised to the surface of the water. Thereafter, the end of the pipe can be cut off and a new section welded in place to permit resumption of the pipe-laying operation. Pipelines which have been damaged in service and contain oil or other liquids are recovered by methods generally similar to these.

The methods referred to above are costly and time consuming because they require that the pipeline pig be run through the entire line from the shore station or platform to the point at which the damage exists. This may necessitate pigging of the line over a distance of several miles and may require the use of high pressure compressors for extended periods of time. It may be difficult to provide compressors with the required capacity and pressure ratings at the necessary location, particularly if the pipeline is one which extends from an offshore platform or similar installation. The pigging operation may cause serious pollution problems if the pipeline to be recovered is one containing oil or a similar material and the contents of the line are discharged into the water at the damaged end. Efforts to overcome these and related difficulties associated with pipeline recovery operations have met with only limited success.

SUMMARY OF THE INVENTION

The present invention provides an improved method and apparatus for use in pipeline recovery operations which alleviates the difficulties referred to above and often reduces substantially the amount of gas which must be introduced into a pipeline before it can be raised to the water's surface. The improved method involves the insertion of a one-way pigging device into the submerged end of the pipeline after the damaged portion has been cut off on bottom and the introduction of gas into the damaged end behind this device until the device has traversed the portion of the line which will be suspended off bottom when the line is raised to the water's surface. The pigging device moves through the pipeline as long as the pressure exerted by the liquid in front of the device is less than that exerted by the gas behind it. When the differential pressure across the pigging device is reversed, the device engages the wall of the pipeline and is held in place. This prevents the backflow flow of liquids into the suspended portion of the line as it is lifted and makes possible venting of the line at the surface without danger of backflow into the suspended pipe and resultant buckling or kinking. After the necessary repairs have been made and the pipelaying operation has been completed, the pigging device can be recovered during the normal pigging operations carried out before the line is placed in service.

The apparatus employed in carrying out the method of the invention comprises a pigging device fitted with a piston, resilient diaphragm, or similar member which moves axially with reference to the outer framework of the device in response to differential pressure. This piston, diaphragm, or the like is mounted on or connected to a central sleeve fitted with pivoted arms which are restrained near their outer ends by pins passing through slots in the frame of the apparatus. The outer ends of the arms are provided with hardened teeth, pads having a high coefficient of friction, or similar means for engaging the inner wall of the pipe in which the apparatus is used. As long as the pressure behind the pig is greater than that in front of the device, the ends of the arms do not contact the wall. When the piston or diaphragm is forced toward the rear of the device in response to differential pressure, the arms move outwardly so that the teeth or pads engage the pipe wall and lock the pigging device in place. This permits venting of the end of the pipeline behind the pigging device without danger of backflow by the liquid in front of the device.

The method and apparatus of the invention simplify the recovery of liquid-filled pipelines, substantially reduce the volume of gas which must be introduced before such lines can be lifted to the water's surface, reduce the danger of backflow of liquid during such recovery operations, and often permit such operations to be carried out at significantly lower cost than has been possible heretofore. As a result of these and other advantages over earlier systems, the method and apparatus may have widespread application.

BRIEF DESCRIPTION OF THE DRAWING

FIG. 1 in the drawing illustrates use of the method of the invention for the recovery of a marine pipeline following an interruption in pipelaying operations;

FIG. 2 depicts, in longitudinal cross section, one embodiment of apparatus useful in operations such as that shown in FIG. 1;

FIG. 3 is a cross section of the apparatus of FIG. 2 taken about the line 3—3;

FIG. 4 depicts an alternate embodiment of apparatus useful in the system illustrated in FIG. 1; and, FIG. 5 is a cross section through the apparatus of FIG. 4 taken about the line 5—5.

DESCRIPTION OF THE PREFERRED EMBODIMENTS

FIG. 1 in the drawing depicts an offshore pipeline recovery operation carried out in accordance with the invention. As shown in FIG. 1, underwater pipeline 11 has been laid along the bottom 12 of a body of water 13 from an offshore platform or similar structure 14. In the particular installation shown, the end of the pipeline adjacent the platform has been connected to the lower end of a pipeline riser 15 which extends upwardly to a point above the water's surface 16 and is held in place on the platform by means of clamps or similar members 17. The type and configuration of the riser will depend upon the particular structure from which the pipeline has been laid and upon other factors. In some cases, for example, the riser may have been formed from line pipe by bending the pipe to produce a large radius curve near the base of the structure and will thus be an integral part of the pipeline; while in other cases, a separate riser may be connected to the end of the pipeline and installed on the structure. In still other instances, the riser may be one of the structural members of the platform or may pass upwardly through such a structural member and may include a flexible joint designed to accommodate limited movement of the structure and riser. The method of the invention is also applicable to pipelines which are not connected to a riser and instead extend from a shore installation or from a point on bottom adjacent an underwater wellhead or other underwater structure.

The laying of the pipeline shown in FIG. 1 has been interrupted at a point several miles from platform 14, either as a result of equipment malfunctioning during a severe storm which resulted in dropping, buckling and flooding of the pipe, or for other reasons. The damaged portion of the line containing the buckled section has been cut off by a diver using an underwater electric arc-oxygen torch or by a submersible vessel fitted with manipulators for operating such a torch or a mechanical cutting device. The corrosion coating and cement jacket which serve to protect the pipe and give it the required weight have been removed from the end of the line. A one-way pig of the type shown in FIGS. 2 and 3 of the drawing or a similar device has been inserted into the open end of the pipeline and a bull plug, cap or other closure 18 fitted with an air inlet and suitable packing has been welded or mechanically connected in place on the end of the pipe over the pigging device. An air line 19 and a lifting cable 20 extend upwardly from the closure 18 to the laybarge or similar vessel 21 from which the pipeline recovery operation is to be carried out. The air line is secured aboard the barge and vented to the atmosphere or connected to a suitable source of high pressure air or gas. The lifting line is connected to a winch or crane 22. The mooring lines and anchors employed to hold the barge in position over the end of the pipeline are not shown in the drawing.

FIGS. 2 and 3 illustrate one embodiment of a one-way pigging device that may be employed in the pipeline recovery operation illustrated in FIG. 1. The apparatus of FIGS. 2 and 3 is shown in place within pipeline 11. This apparatus comprises an elongated central rod 30 of steel or similar material upon which a longitudinally movable sleeve 31 is mounted. An O-ring or similar seal, not shown in the drawing, may be provided to prevent fluid from leaking between the sleeve and rod. A stop 32 may be provided on the rod to limit movement of the sleeve toward the rear of the device. Brackets 33, 34, 35 and 36 are mounted on the outer surface of the sleeve at 90° intervals as shown in FIG. 3. These brackets support radial arms 37, 38, 39 and 40. Each arm is pivoted to a bracket on sleeve 31 and is restrained near its outer end by a pin held in slots in the outer framework of the apparatus. The outer end of each arm is provided with hardened teeth as indicated by reference numeral 41 or with pads having a high coefficient of friction for engaging the inner wall of pipe 11.

The outer framework of the apparatus of FIGS. 2 and 3 includes longitudinal members 42, 43, 44, 45, 46, 47, 48 and 49, which are arranged in pairs spaced at 90° intervals about the circumference of the device. Each pair of longitudinal members contains vertical slots 50 within which a pin 51 attached to one of the arms is free to move. The ends of the longitudinal members are attached to circular channels 52 and 53. The openings in these channels face outwardly toward the wall of pipe 11 and serve to retain resilient rings 54 and 55 of rubber or similar material. The rings bear against the inner pipe wall. The circular channels are connected to rod 30 by straps 56 near the front of the device and straps 57 at the rear of the apparatus. A diaphragm 58 of rubber, plastic or similar flexible material is attached to the outer framework by means of flanges 59 on circular channel 52 and flanges 60 on the forward end of sleeve 31. In some cases, a rolling diaphragm may be used if desired.

In operation, the pigging device shown in FIGS. 2 and 3 of the drawing moves forward through the pipeline from left to right in response to pressure behind the device. As long as this pressure exceeds that in front of the apparatus, diaphragm 58 holds sleeve 31 in a forward position on rod 30. Arms 37 through 40 are held in a retracted position with respect to the pipe wall. Movement of the sleeve and diaphragm forward on the rod is limited by pins 51 in slots 50. When the pressure behind the pigging device is reduced to a level below that in front of the device, the diaphragm moves sleeve 31 to the rear on rod 30. This movement forces arms 37 through 40 outwardly with respect to the apparatus until teeth 41 engage the inner wall of the pipeline. Stop 32 limits movement of sleeve 31 on the rod. Engagement of the teeth with the pipe wall holds the pigging device in place and prevents further movement. Resilient ring 54 serves as a seal to prevent movement of fluid around the pigging device. The device will thus remain in place as long as the pressure in front of the apparatus exceeds that behind it. When the pressure behind the device is again raised to a level above that in front of it, the diaphragm will move the sleeve forward and retract the arms from the pipe wall, thus permitting further movement of the pig in response to the differential pressure. The apparatus thus functions as a one-way pig in that it will move through the pipeline in only one direction and is capable of resisting pressure applied in the other direction.

FIGS. 4 and 5 in the drawing illustrate an alternate embodiment of the apparatus which utilizes a piston in place of the diaphragm shown in FIGS. 2 and 3. The apparatus of FIGS. 4 and 5 includes a short cylindrical sleeve 70 within which piston 71 fitted with seal ring 72 is mounted. A seal or packing element 73 of rubber or similar resilient material is fixed to the outer surface of sleeve 70 and held in place by metallic bands 74, 75 and 76. The seal seats against the inner wall of pipeline 11 to prevent the movement of fluids past the pigging device. Straps 77 extend forward from sleeve 70 at intervals of about 120° on the sleeve circumference and are connected at their outer ends to form the front of the device. Inner horizontal sleeve 78 is attached to the rear face of the piston at its center and extends over the front end of horizontal rod 79. The rear end of rod 79 is welded to straps 80 which extend radially at 120° intervals. Longitudinal members 81, 82, 83, 84, 85 and 86 extend between the ends of straps 80 and the rear edge of sleeve 70. These members are arranged in pairs at 120° intervals about the apparatus and form an outer framework which serves to support wheels or rollers near the back of the device. Only two of these wheels, indicated by reference numerals 87 and 88, are shown in the drawing. The wheels contact the inner wall of pipe 11 and help support the apparatus as it moves through the pipeline. The front ends of longitudinal members 81 through 86 extend into sleeve 70 and limit the movement of piston 71 within the sleeve.

Radial arms 89, 90 and 91 on the apparatus of FIGS. 4 and 5 are pivotally connected to the rear end of horizontal sleeve 78 by means of brackets 92, 93 and 94 and extend between adjacent longitudinal members in the outer framework of the apparatus. Each arm includes a pin 95 which extends through slots 96 in the longitudinal members. The outer ends of the arms are provided with hardened teeth as indicated by reference numeral 97 or with pads or similar means for holding the apparatus in place. These teeth clear the inner wall of pipe 11 as long as piston 71 is in a forward position within sleeve 70. This will normally be the case as long as the fluid pressure behind the pigging device is greater than that in front of the apparatus. When the pressure behind the device is reduced to a level below that in front of the apparatus, the piston will move to the rear and force the arms outwardly until the teeth or other means engage the pipeline wall. This holds the pigging device in place and prevents movement to the rear. It will be understood that the method of the invention is not restricted to use of the specific apparatus shown in FIGS. 2 through 5 and that other pigging devices capable of moving through a pipeline in one direction and resisting movement in the opposite direction may also be employed.

After the pigging device has been inserted into the end of pipeline 11 in FIG. 1 and closure 18 fitted with air line 19 has been installed as described above, it will normally be preferred to lower a pump, which does not appear in the drawing, into position in pipeline riser 15 by means of a string of flexible tubing, pipe, steel reinforced hose, or similar conduit 23. A packer or similar device may be provided to maintain a seal between the pump or conduit and the inner wall of the riser if desired. The conduit should extend upwardly above the upper end of the riser and will normally be fitted with a band 24 to permit the discharge of liquids pumped upwardly through the conduit. The pump and conduit are supported in the riser by means of a line from crane 25. The pump employed may be electrically, hydraulically or mechanically actuated. In case where the riser bend precludes lowering of the pump to the bottom of the riser, a flexible tail pipe sufficiently long to extend downwardly into the pipeline itself may be attached to the bottom of the pump to serve as a liquid intake line. Following installation of the pump and conduit, liquids are pumped from the pipeline upwardly through the conduit to the surface. If the liquid contained in the pipeline is sea water, the discharge will normally be disposed of over the side as shown in FIG. 1. If, on the other hand, the pipeline is one that has been damaged in service and the liquid contained therein is oil or a similar material, the effluent from the conduit will instead be directed into tanks on the platform or on a barge moored nearby. As the liquid is withdrawn from the pipeline, pressure exerted by the gas introduced into the other end of the line propels the pigging element forward through the line. In some cases, atmospheric pressure will be sufficient to move the pig as the water is pumped out; while in some other cases, compressed gas will be needed to overcome the hydrostatic pressure exerted by water in the line. In a substantially horizontal line where the pipeline riser contains a packer or similar seal about the pump or conduit and essentially all of the water can be pumped out or in a line which slopes upwardly toward the end which is to be recovered, for example, the total force due to atmospheric pressure which is available to move the pigging element may be in excess of 6,000 pounds and hence the use of high pressure air or gas to propel the pig is usually unnecessary. In a line which slopes downwardly toward the end which is to be recovered and from which all of the water cannot be removed by pumping at the other end, on the other hand, it will normally be necessary to inject air or gas at a pressure sufficient to overcome the hydrostatic head of the water between the end of the line and the intake level of the pump. The use of a pump to lower the water level in the riser, and in some cases in the pipeline itself, permits the use of a compressor or other gas source having a much lower discharge pressure and capacity than would be required if the pump were not used. In operations where the compressor or gas source must be located aboard a barge or other vessel as shown, this often permits substantial reduction in costs.

The pumping of liquid and the introduction of gas into the pipeline of FIG. 1 as described above is continued until a section of the line long enough to extend to the surface of the water along the modified catenary curve which the suspended pipe will assume has been substantially voided of liquid. Since the weight of the pipe and depth of the water are known, the length of the section from which the liquid must be removed can be readily calculated. By measuring the volume of liquid discharged from the pipeline at platform 14, the arrival of the pigging device at the necessary point in the pipeline can be determined. At this point, the withdrawal of water and the injection of the air or gas can be terminated and the air line can be vented onboard the barge at the surface if desired. The teeth on the one-way pigging device will engage the pipe wall in response to the reduction in pressure behind the device and hold the device in place so that no backflow of water into the dewatered section of the line can occur. Thereafter, lifting cable 20 can be transferred to a winch and used to lift the end of the pipeline to the surface of the water. Sufficient tension should be maintained on the gas-filled line during the lifting operation to prevent the line from buckling. The tension needed, which will be much less than would be required if the line were filled with liquid, can be calculated by methods which will be familiar to those skilled in the art. Multiple cables spaced at intervals along the section of line to be raised can also be employed for lifting purposes. After the end of the line has been lifted to the surface of the water, the pipeline can be transferred to a stinger on the laybarge or secured by means of cables on the barge. With the end of the line supported above the water in this manner, closure 18 can be removed from the line and a new length of pipe can be welded in place to permit the resumption of normal pipelaying operations. After the pipeline has been completed, the pigging device can be recovered during the normal pigging operation carried out before the line is placed in service.

The presence of the pigging device in the pipeline during the remainder of the pipelaying operation normally presents no difficulty. In the event that a second recovery operation has to be carried out before the device is removed from the line, the procedure above can be repeated. The air or gas injected into the end of the line to displace a second pigging device through a portion on the line will cause the first pigging device to move farther along the line, displacing any liquids in front of it. Both devices can later be recovered by pigging through the line from the terminus to platform 14 before the pipeline is placed in service.

It will be understood that the method and apparatus of the invention are not restricted to the particular type of pipeline recovery operation described above and instead have wider application. The use of a one-way pigging device during a pipeline recovery operation in which water is to be displaced from the end of the pipeline on bottom minimizes the volume of air or gas which must be introduced into the line, permits venting of the suspended line to the atmosphere without danger of backflow and buckling of the pipe, and has other advantages over methods which have been employed in the past. The system described can be used for the recovery of damaged lines containing oil or other liquids as well as for the recovery of water-filled lines.

I claim:

1. A method for recovering a submerged end of a liquid-filled pipeline from the bottom of a body of water which comprises inserting into said submerged end of said pipeline a one-way pigging device adapted to move forward in said pipeline in response to fluid pressure from behind said device and to resist movement in response to fluid pressure from the opposite direction; introducing a gas into said submerged end of said pipeline behind said pigging device under sufficient pressure to move said pigging device forward in said pipeline while preventing the entry of water into said submerged end until said pigging device has traversed a section of said pipeline sufficiently long to extend at least to the surface of said body of water; discontinuing the introduction of said gas; and thereafter lifting said submerged end of said pipeline to the water's surface, said pigging device preventing the backflow of liquid in said pipeline in response to changes in pressure.

2. A method as defined by claim 1 including the additional step of withdrawing liquids from said pipeline in advance of said one-way pigging device.

3. A method as defined by claim 1 wherein said gas is introduced at a pressure in excess of the hydrostatic head exerted by liquid present in said pipeline.

4. A method as defined by claim 1 wherein said gas is introduced at essentially atmospheric pressure.

5. A method as defined by claim 1 wherein said liquid is withdrawn by lowering a pump in a pipeline riser to which said pipeline is connected and pumping liquid from said riser to the water's surface.

6. A method for recovering an end of a submerged liquid-filled pipeline from the bottom of a body of water which comprises inserting into said end of said pipeline a pigging device adapted to move forward through said pipeline in response to differential pressure from behind said device and to resist movement in response to pressure from the opposite direction, installing a fluid-tight closure fitted with a gas inlet line on said end of said pipeline behind said pigging device, injecting a gas through said gas inlet line into said pipeline from a source at the surface of said body of water while discharging liquid from the other end of said pipeline until said pigging device has displaced liquid from a section of said pipeline adjacent said end sufficiently long to extend from said bottom of said body of water along a modified catenary curve to a point above the surface of said body of water, and thereafter lifting said end of said pipeline to the water's surface under sufficient tension to prevent buckling of the pipeline, said pigging device preventing the backflow of liquid into the gas-filled section of said pipeline in response to changes in pressure therein.

7. A method as defined by claim 6 including the step of pumping liquids from said pipeline in advance of said pigging device.

8. A method as defined by claim 6 wherein said gas is air.

9. A method as defined by claim 6 wherein said pigging device is inserted in said end of said pipeline by a diver.

10. A method as defined by claim 6 wherein said gas inlet line is vented to the atmosphere after said pigging device has moved through said section of said pipeline.

11. A pipeline pigging device which comprises an outer framework, a sealing element mounted on said outer framework about the periphery thereof for maintaining a seal between said framework and the inner wall of a pipeline, a fluid-tight member supported within said outer framework and longitudinally movable with respect thereto in response to differential pressure, a plurality of wall-engaging members attached to said outer framework for engaging said inner wall of said pipeline and holding said framework in fixed position within said pipeline, and means linking said wall-engaging members and said fluid-tight member for extending said wall-engaging members into contact with the pipeline wall when said movable member moves toward the rear of said outer framework in response to differential pressure.

12. Apparatus as defined by claim 11 wherein said fluid-tight member comprises a diaphragm.

13. Apparatus as defined by claim 11 wherein said fluid-tight member comprises a piston.

14. A one-way pig for use in pipelining operations which comprises a rigid body structure containing a central opening therein, a sealing element extending about the periphery of said body structure for maintaining a seal between said structure and the inner wall of a pipeline, a longitudinally movable member mounted in said central opening in fluid-tight relationship to said body structure, a plurality of radial arms linked to said body structure for engaging said inner wall of said pipeline and holding said structure in place therein, and means attached to said longitudinally movable member for retracting said radial arms in response to fluid pressure from behind said body structure and for extending said arms in response to fluid pressure in the opposite direction.

15. A pig as defined by claim 14 wherein said radial arms are linked to said body structure near the outer ends of said arms by pins which extend into slots in said structure and said arms are pivoted near their inner ends to said means attached to said longitudinally-movable member.

16. A pig as defined by claim 14 wherein said longitudinally-movable member comprises a diaphragm and said means attached to said member comprises a slidable member to which said radial arms are pivotally connected near their inner ends.

17. A pig as defined by claim 14 wherein the outer ends of said radial arms are provided with teeth for engaging said inner wall of said pipeline.

18. A pig as defined by claim 14 wherein said body structure includes a cylindrical sleeve and said longitudinally-movable member comprises a piston mounted in said sleeve.

19. A pig as defined by claim 14 including rollers for supporting said body structure within said pipeline.

20. A pig as defined by claim 14 wherein said sealing element comprises a resilient ring attached to the outer surface of said body structure.

21. A pipeline pigging device adapted to move through a pipeline in one direction and resist movement in the opposite direction which comprises a generally cylindrical pig body, a resilient sealing element on the periphery of said body for maintaining a seal between said body and the inner wall of a surrounding pipeline, holding means on said body for engaging said inner wall and preventing movement of said body within said pipeline, and means for disengaging said holding means in response to fluid pressure tending to move said body forward in said pipeline and for actuating said holding means in response to fluid pressure tending to move said body in the opposite direction.

* * * * *